Feb. 20, 1945. A. BOUWERS 2,369,772
APPARATUS FOR RECTIFICATION AND VOLTAGE INCREASE
Filed Jan. 11, 1943
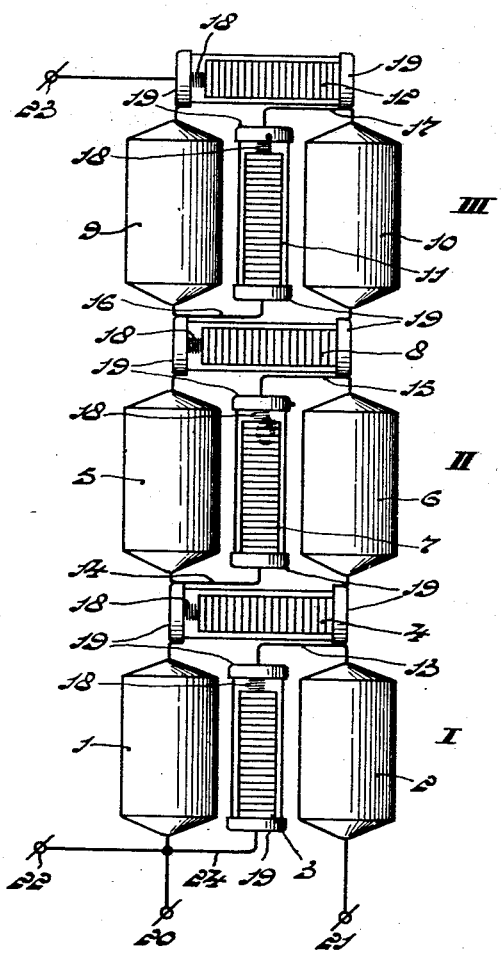
Inventor
Albert Bouwers
By [signature]
Attorney Patented Feb. 20, 1945

2,369,772

UNITED STATES PATENT OFFICE 2,369,772

APPARATUS FOR RECTIFICATION AND VOLTAGE INCREASE

Albert Bouwers, Eindhoven, Netherlands

Application January 11, 1943, Serial No. 472,077
In the Netherlands January 20, 1941

2 Claims. (Cl. 175—363)

This invention relates to a rectifying and voltage multiplying device for supplying electrostatic systems and systems requiring a relatively small current at a voltage which is of the order of a few times as high as that of the available source of alternating current.

For changing alternating current into direct current with multiplication of the voltage use may be made of a device having a cascade-circuit arrangement. Such a device comprises a plurality of series-connected rectifiers in the form of incandescent cathode discharge tubes connected in series with the source of alternating current and with a condenser, each pair of successive tubes being shunted by a condenser.

In this circuit arrangement each of the incandescent cathodes of the rectifiers has a different potential so that each cathode requires its own source of filament current and cannot be supplied from a common source of energy unless particular precautions are taken. In systems of comparatively high power the difficulties entailed by the use of any of the various well-known methods for supplying the incandescent cathodes are not of major importance. In devices for producing a relatively small current, particularly those for which only little space is available, the supply of the incandescent cathodes presents great difficulty and blocking-layer rectifiers may be used with advantage.

The invention has for its object to arrange rectifier systems particularly for relatively small current output (less than 1 amp.) and comprising blocking-layer cells in cascade circuit in such manner that the available space required by the system is utilised most efficiently.

Blocking-layer rectifiers adapted for voltages supplied from a normal alternating current supply circuit are made in the form of rod-shaped elements composed of a plurality of cells which are stacked in a small tube of insulating material or are provided with a central aperture and strung on a mandrel. By the use of rectifiers in this form and by a suitable arrangement of the rectifiers and condensers, the invention materially reduces the space required for accommodation. For this purpose, every two block-shaped rectifier elements are arranged in a T-shape and two condensers of approximately equal length as the rectifier elements are arranged below the transversely located element symmetrically on either side of the other rectifier element. A group of two rectifier elements and two condensers is thus formed such a group permitting the voltage of the source of alternating current to be approximately doubled whereby the direct voltage thus obtained has a value of about double the maximum value of the alternating voltage. Two or more of such groups are arranged in line with each other.

The volume of the condensers for a given voltage depends on the required capacity value, but there is a comparatively great freedom in regard to the choice of the ratio of length and diameter with cylindrical condensers or of the length, width and thickness of otherwise shaped condensers. It is therefore generally possible to make the length of the condensers approximately equal to that of the rectifiers.

If, moreover, care is taken that the length of the condensers and rectifiers is about equal to the sum of the diameters of a rectifier and a condenser measured in the plane in which they are located, particularly advantageous utilization of the space is obtained. In this case, the poles of the transversely arranged rectifiers become located in close proximity to the poles of the condensers with which they are to be connected. Comparatively short conductors may thus be used for the connection of the rectifiers which are arranged longitudinally of the system and which diagonally connect the condensers by which they are flanked.

In order that the invention may be clearly understood and readily carried into effect it will now be described more fully with reference to the accompanying drawing, in which one form of construction of the device according to the invention is illustrated.

The device shown is formed by three groups or stages I, II and III each composed of two rod-shaped rectifier elements and two cylindrical condensers.

Thus, group I is formed by a rectifier element 3, flanked by two condensers 1 and 2 and by a rectifier element 4 which is so arranged as to form a T with the rectifier 3. The elements 3 and 4 are of approximately the same length as the condensers 1 and 2. Group II is formed by condensers 5 and 6 and rectifier elements 7 and 8 arranged in the same manner as the condensers 1 and 2 and the elements 3 and 4. Group III is formed by similarly arranged condensers 9 and 10 and rectifier elements 11 and 12.

The rectifier 4 connects the adjacent poles of the condensers 1, 2 and 5, 6 respectively. The rectifier 8 connects the adjacent poles of the condensers 5, 6 and 9, 10 respectively and the rectifier 12 the adjacent poles of the condensers 9 and 10. The connections are very short owing to the rectifier elements being about equally long as the sum of the diameters of a rectifier element and a condenser measured in the plane of the drawing and the points to be connected being consequently close to each other. The rectifier elements arranged longitudinally of the system diagonally connect the condensers. Thus, the element 3 is connected between the lowermost pole of condenser 1 and the uppermost pole of condenser 2. The element 7 is similarly connected between condensers 5 and 6 and the element 11 between condensers 9 and 10. They also require but short connecting wires 24, 13, 14, 15, 16 and 17.

The rectifier elements are formed by small glass tubes having arranged in them a plurality of blocking-layer cells, for example selenium cells, in stacked form which are thus connected in series and are each loaded with but a small part of the voltage existing in each element. The cells are forced together by small springs 18. Small metal hoods 19 close the glass tubes and serve for the attachment of the supply leads, which are secured thereto by soldering. The rectifier elements do not need any special support but are simply suspended from the connecting wires.

If the lowermost poles of the condensers 1 and 2, and hence the terminals 20 and 21, are connected to an alternating voltage having an effective value of 220 volts each group supplies a rectified voltage of about 600 volts. For this purpose, about 20 cells per element have to be used and hence 120 cells are required for the entire device.

Between the lowermost pole of condenser 1 and the uppermost pole of condenser 9, and hence between the terminals 22 and 23, a voltage of about 1800 volts is thus available. From the intermediate stages voltages of about 600 and 1200 volts can be obtained. Higher voltages may be obtained by correspondingly increasing the number of stages.

The said voltages may be used for energizing the various electrodes of cathode-ray tubes, for supplying amplifier valves, for producing the directional field of electrostatical measuring instruments, for freeing from gases by electrostatical means, for testing insulators, briefly for all purposes for which a comparatively high voltage but a relatively small current is required.

What I claim is:

1. A voltage-multiplier rectifier assembly comprising cascade connected rod-shaped blocking-layer rectifier elements and condensers arranged in a plurality of groups, the rectifier elements being of approximately the same length as the condensers, each of said groups comprising two rectifier elements arranged in a T-shape and two condensers arranged below the transversely located rectifier element and on opposite sides of the other rectifier element, said groups being arranged in line with each other.

2. A voltage-multiplier rectifier assembly as claimed in claim 1 wherein the length of the rectifier elements and of the condensers is approximately equal to the sum of the diameters of a rectifier element and a condenser.

ALBERT BOUWERS.